US012180751B2

(12) United States Patent
Fodstad et al.

(10) Patent No.: US 12,180,751 B2
(45) Date of Patent: Dec. 31, 2024

(54) ELECTRIC LATCH RETRACTION WITH POWER INTERRUPT

(71) Applicant: Schlage Lock Company LLC, Carmel, IN (US)

(72) Inventors: Jason Fodstad, Zionsville, IN (US); Jack R. Lehner, Jr., Indianapolis, IN (US); John Stalter, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 1080 days.

(21) Appl. No.: 16/197,511

(22) Filed: Nov. 21, 2018

(65) Prior Publication Data

US 2020/0157851 A1 May 21, 2020

(51) Int. Cl.
*E05B 65/10* (2006.01)
*E05B 41/00* (2006.01)
*E05B 47/00* (2006.01)

(52) U.S. Cl.
CPC .......... *E05B 65/1093* (2013.01); *E05B 41/00* (2013.01); *E05B 47/0004* (2013.01);
(Continued)

(58) Field of Classification Search
CPC .. E05B 65/108; E05B 47/0012; E05B 47/026; E05B 65/1046; E05B 65/1093; E05B 41/00; E05B 47/0001; E05B 47/00; E05B 65/1053; E05B 47/0046; E05B 2047/005; E05B 2047/0066; E05B 2047/0084; E05B 2047/0053;
(Continued)

(56) References Cited

U.S. PATENT DOCUMENTS 4,762,350 A * 8/1988 Hurtado ................ E05C 19/003
292/259 R
5,035,450 A 7/1991 Muller
(Continued)

FOREIGN PATENT DOCUMENTS

| | | |
|---|---|---|
| CH | 557464 A | 12/1974 |
| GB | 578563 A | 7/1946 |
| KR | 1020040055434 A | 6/2004 |

OTHER PUBLICATIONS

International Search Report; International Searching Authority; International Application No. PCT/US2019/062624; Feb. 19, 2020; 2 pages.

(Continued)

*Primary Examiner* — Mark A Williams
(74) *Attorney, Agent, or Firm* — Taft Stettinius & Hollister LLP

(57) ABSTRACT

An exemplary access control device includes a locking member having a locked position and an unlocked position; an electronic actuator operably connected with the locking member; a switch connected between the electronic actuator and a power supply, the switch having a closed state in which the electronic actuator is connected to the power supply and is operable to maintain the locking member in the unlocked position, the switch having an open state in which the electronic actuator is disconnected from the power supply; and a manual actuator operable to transition the switch between the open state and the closed state.

28 Claims, 5 Drawing Sheets

(52) U.S. Cl.
CPC .. *E05B 65/1053* (2013.01); *E05B 2047/0016* (2013.01); *E05B 2047/0023* (2013.01); *E05B 2047/0066* (2013.01); *E05Y 2400/445* (2013.01); *E05Y 2400/854* (2013.01); *E05Y 2800/25* (2013.01); *E05Y 2900/132* (2013.01)

(58) Field of Classification Search
CPC ......... E05Y 2400/852; E05Y 2400/854; E05Y 2400/445; E05Y 2800/25; E05Y 2900/132
See application file for complete search history.

(56) References Cited

U.S. PATENT DOCUMENTS

| | | | | |
|---|---|---|---|---|
| 5,412,961 | A | 5/1995 | Cain et al. | |
| 5,535,607 | A | 7/1996 | Dzurko et al. | |
| 5,850,753 | A * | 12/1998 | Varma | E05B 47/0047 292/341.16 |
| 5,988,708 | A | 11/1999 | Frolov et al. | |
| 6,062,612 | A * | 5/2000 | Lin | E05B 47/0012 292/144 |
| 6,067,826 | A * | 5/2000 | Holloway | E05B 81/25 292/201 |
| 6,116,661 | A | 9/2000 | Overbey et al. | |
| 7,862,091 | B2 | 1/2011 | Escobar | |
| 7,883,123 | B2 | 2/2011 | Condo et al. | |
| 8,480,136 | B2 | 7/2013 | Dye et al. | |
| 9,567,773 | B2 * | 2/2017 | Dore Vasudevan | E05B 47/00 |
| 9,663,972 | B2 * | 5/2017 | Ullrich | E05B 65/462 |
| 9,945,158 | B2 | 4/2018 | Lehner, Jr. et al. | |
| 10,612,289 | B2 * | 4/2020 | Ibsies | H04N 7/186 |
| 2008/0244984 | A1 * | 10/2008 | Kelly | E06B 7/36 49/383 |
| 2009/0079204 | A1 | 3/2009 | Whitaker et al. | |
| 2009/0173114 | A1 * | 7/2009 | Lin | E05B 47/0012 70/91 |
| 2009/0173120 | A1 * | 7/2009 | Lin | E05B 17/0058 70/279.1 |
| 2011/0259059 | A1 * | 10/2011 | Wu | E05B 63/0017 70/91 |
| 2014/0109479 | A1 | 4/2014 | Morstatt et al. | |
| 2014/0260451 | A1 * | 9/2014 | Quach | E05B 1/0007 70/278.1 |
| 2015/0115622 | A1 * | 4/2015 | Burdenko | E05B 47/0001 292/138 |
| 2016/0047148 | A1 * | 2/2016 | Aker | E05C 3/14 292/220 |
| 2016/0060903 | A1 | 3/2016 | Russo et al. | |
| 2016/0230423 | A1 | 8/2016 | Lehner, Jr. et al. | |
| 2017/0122007 | A1 * | 5/2017 | Moon | E05B 63/0017 |
| 2017/0292294 | A1 | 10/2017 | Brennan et al. | |
| 2018/0245375 | A1 | 8/2018 | Arlinghaus et al. | |
| 2019/0145130 | A1 * | 5/2019 | Affan | E05C 1/004 292/144 |

OTHER PUBLICATIONS

Written Opinion of the International Searching Authority, International Searching Authority; International Application No. PCT/US2019/062624; Feb. 19, 2020; 6 pages.
Canadian Examination Report; Canadian Intellectual Property Office; Canadian Application No. 3,120,854; Jul. 15, 2022; 3 pages.
Extended European Search Report; European Patent Office; European Application No. 19886592.5; Jul. 29, 2022; 7 pages.
Canadian Examination Report; Canadian Intellectual Property Office; Canadian Application No. 3,120,854; Feb. 1, 28, 2023; 5 pages.

* cited by examiner

ELECTRIC LATCH RETRACTION WITH POWER INTERRUPT

TECHNICAL FIELD

The present disclosure generally relates to access control mechanisms having electric latch retraction features, and more particularly but not exclusively relates to electrified exit devices.

BACKGROUND

Certain access control mechanisms such as exit devices include motor- or solenoid-driven mechanisms that can hold the device in an unlatched state to permit push/pull operation of the door. Such devices typically return to a latched or secure state when electrical power is removed from the electromechanical driver. The transitions between the unlatched state and the latched state are typically managed by an electronic access control system, which relies on presentation of credentials and/or on schedules to determine when to change states.

One issue that has arisen with conventional exit devices is that individuals on the secured side of a door are typically unable to prevent ingress from unwelcome intruders who may have come into possession of valid credentials, such as a key card or personal identification number (PIN). Users currently do not have the ability to prevent access locally at an opening, and typically must rely on security personnel to lock down an opening or an entire facility, which can result in unnecessarily long response times. An alternative method of locally securing a door is through the use of so-called "barricade devices," which may be installed or activated from the secured side of the door to prevent ingress. These devices do not conform to building codes developed by the International Code Council (ICC), National Fire Protection Association (NFPA), and others because they do not allow free egress during emergencies. As a result, their use is not permitted in many jurisdictions.

As should be evident from the foregoing, certain conventional access control mechanisms suffer from a number of drawbacks and deficiencies, including those related to securing the barrier against unwanted intruders during lockdown situations. For these reasons among others, there remains a need for further improvements in this technological field.

SUMMARY

An exemplary access control device includes a locking member having a locked position and an unlocked position; an electronic actuator operably connected with the locking member; a switch connected between the electronic actuator and a power supply, the switch having a closed state in which the electronic actuator is connected to the power supply and is operable to maintain the locking member in the unlocked position, the switch having an open state in which the electronic actuator is disconnected from the power supply; and a manual actuator operable to transition the switch between the open state and the closed state. Further embodiments, forms, features, and aspects of the present application shall become apparent from the description and figures provided herewith.

DETAILED DESCRIPTION OF ILLUSTRATIVE EMBODIMENTS

Figure 1:
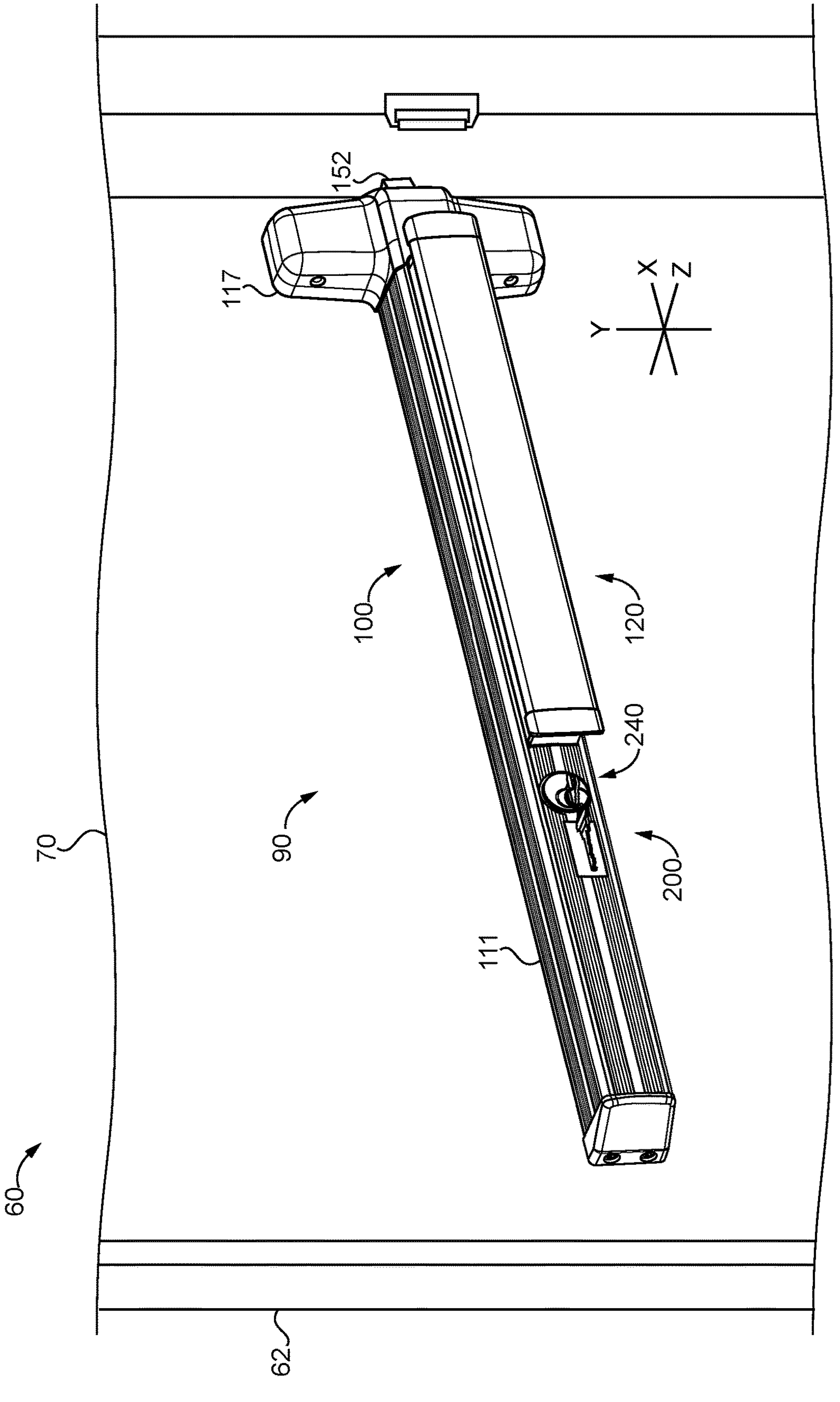
FIG. 1 is a perspective view of an exit device according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. The directions defined by each axis may be referred to as positive and negative directions, wherein the arrow of the axis indicates the positive direction. In the coordinate system illustrated in FIG. 1, the X-axis defines first and second longitudinal directions, the Y-axis defines first and second lateral directions, and the Z-axis defines first and second transverse directions.

Additionally, the descriptions that follow may refer to the directions defined by the axes with specific reference to the orientations illustrated in the Figures. For example, the longitudinal directions may be referred to as "distal" ($X^+$) and "proximal" ($X^-$). These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

With reference to FIG. 1, illustrated therein is a closure assembly 60 including a swinging door 70 and an exit device 90 mounted to the door 70. The door 70 is mounted to a doorframe 62 for swinging movement between an open position and a closed position, and the exit device 90 is configured to selectively retain the door 70 in the closed position. In certain embodiments, the closure assembly 60 may be considered to further include the doorframe 62. The closure assembly 60 has a plurality of states or conditions, including a secured condition, an unsecured condition, and an open condition. In the secured condition, the door 70 is in its closed position, the exit device 90 is in a deactuated state, and the exit device 90 engages the doorframe and retains the door 70 in its closed position. Actuation of the exit device 90 causes the closure assembly 60 to transition to the unsecured condition, in which the door 70 is capable of being moved from its closed position to its open position under push/pull operation. Such movement of the door 70 to its open position causes the closure assembly 60 to transition to the open condition.

Figure 2:
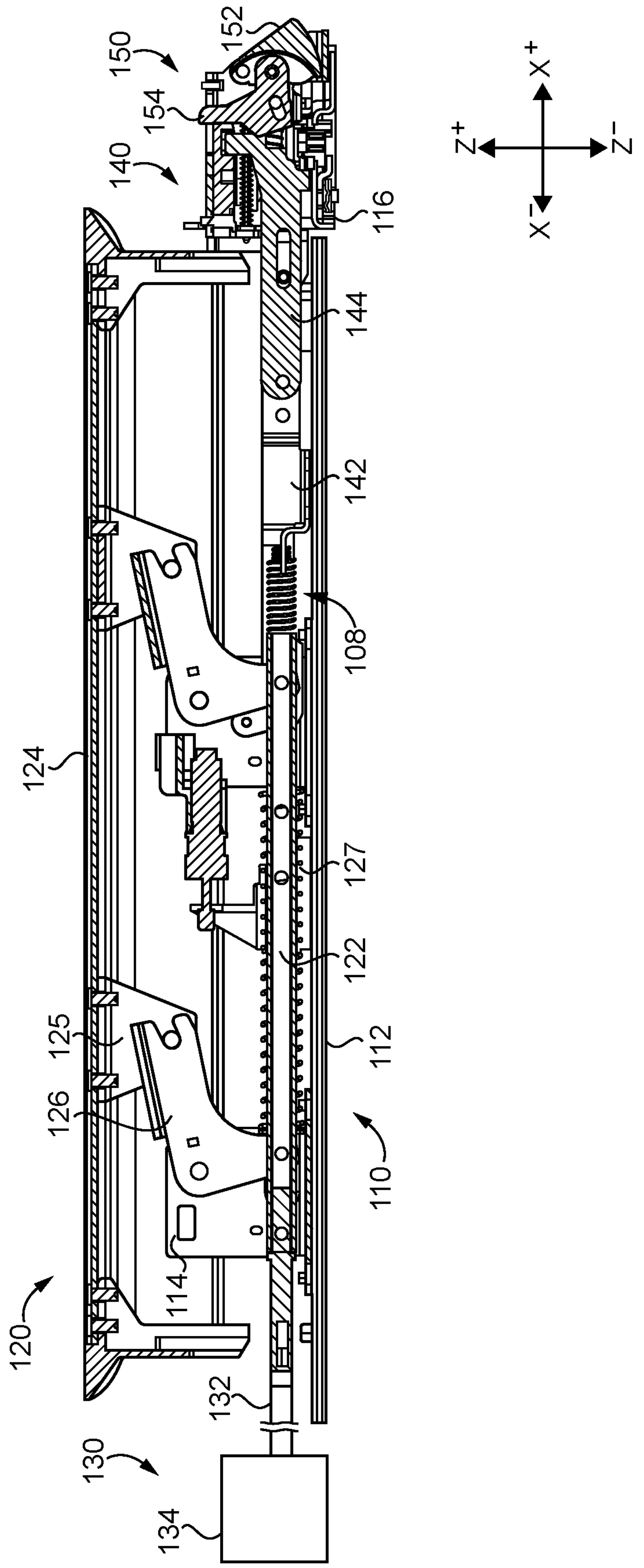
FIG. 2 is a cross-sectional illustration of a portion of the exit device illustrated in FIG. 1.
Figure 3:
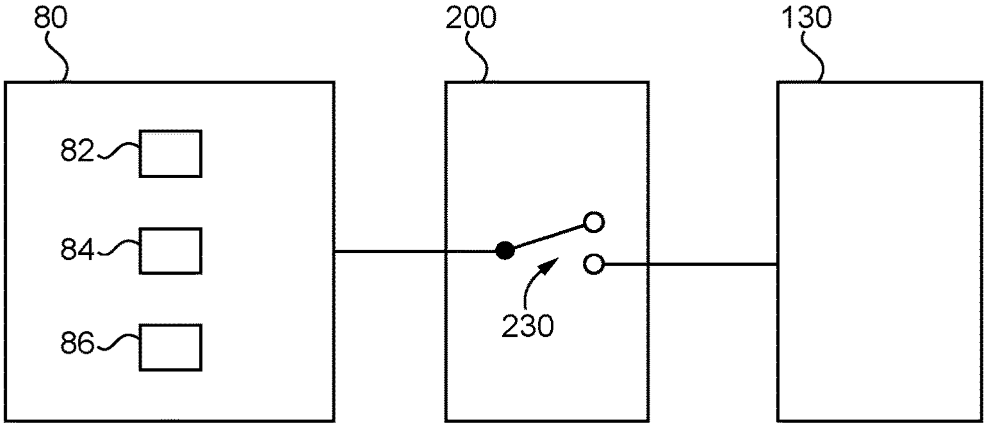
FIG. 3 is a schematic block diagram of a system according to certain embodiments.

With additional reference to FIGS. 2 and 3, the exit device 90 generally includes a pushbar assembly 100 including a mounting assembly 110 configured for mounting to the door 70, a drive assembly 120 mounted to the mounting assembly 110 for movement between an actuated state and a deactuated state, an electronic actuator 130 operable to transition the drive assembly 120 between the actuated state and the deactuated state, a latch control assembly 140 operably connected with the drive assembly 120 via a lost motion connection 108, and a latchbolt mechanism 150 operably coupled with the latch control assembly 140.

As described herein, the drive assembly 120 is biased toward the deactuated state, and is operable to be driven to the actuated state when manually actuated by a user or when electrically actuated by the electronic actuator 130. The latch control assembly 140 also has an actuated state and a deactuated state, and is operably connected with the drive assembly 120 such that actuation of the drive assembly 120 causes a corresponding actuation of the latch control assembly 140. As described in further detail below, the electronic actuator 130 is selectively connected to a power supply, and the exit device 90 further includes an interrupt assembly 200 configured to selectively disconnect the electronic actuator 130 from the power supply.

The mounting assembly 110 generally includes an elongated channel member 111, a base plate 112 mounted in the channel member 111, and a pair of bell crank mounting brackets 114 coupled to the base plate 112. The channel member 111 extends along the longitudinal (X) axis 102, has a width in the lateral (Y) directions, and has a depth in the transverse (Z) directions. Each of the mounting brackets 114 includes a pair of laterally-spaced walls that extend away from the base plate 112 in the forward ($Z^+$) direction. The illustrated mounting assembly 110 also includes a faceplate 113 that encloses a distal end portion of the channel member 111, a header plate 116 positioned adjacent a proximal end of the channel member 111, and a header casing 117 mounted to the header plate 116.

The drive assembly 120 includes a drive rod 122 extending along the longitudinal axis 102, a pushbar 124 having a pair of pushbar brackets 125 mounted to the rear side thereof, and a pair of bell cranks 126 operably connecting the drive rod 122 with the pushbar 124. As described herein, the drive rod 122 is mounted for movement in the longitudinal (X) directions, the pushbar 124 is mounted for movement in the transverse (Z) directions, and the bell cranks 126 couple the drive rod 122 and the pushbar 124 for joint movement during actuation and deactuation of the drive assembly 120. Each bell crank 126 is pivotably mounted to a corresponding one of the bell crank mounting brackets 114. Each bell crank 126 includes a first arm pivotably connected to the drive rod 122, and a second arm pivotably connected to a corresponding one of the pushbar brackets 125. The pivotal connections may, for example, be provided by pivot pins 121. The drive assembly 120 further includes a return spring 127 that is engaged with the mounting assembly 110 and which biases the drive assembly 120 toward its deactuated state.

Each of the drive rod 122 and the pushbar 124 has an actuated position in the actuated state of the drive assembly 120, and a deactuated position in the deactuated state of the drive assembly 120. During actuation and deactuation of the drive assembly 120, the drive rod 122 moves in the longitudinal (X) directions between a proximal deactuated position and a distal actuated position, and the pushbar 124 moves in the transverse (Z) directions between a projected or forward deactuated position and a depressed or rearward actuated position. Thus, during actuation of the drive assembly 120, the drive rod 122 moves in the distal ($X^-$) direction, and the pushbar 124 moves in the rearward ($Z^-$) direction. Conversely, during deactuation of the drive assembly 120, the drive rod 122 moves in the proximal ($X^+$) direction, and the pushbar 124 moves in the forward ($Z^+$) direction. The bell cranks 126 translate longitudinal movement of the drive rod 122 to transverse movement of the pushbar 124, and translate transverse movement of the pushbar 124 to longitudinal movement of the drive rod 122.

With the drive assembly 120 in its deactuated state, a user may depress the pushbar 124 to transition the drive assembly 120 to its actuated state. As the pushbar 124 is driven toward its depressed position, the bell cranks 126 translate the rearward movement of the pushbar 124 to distal movement of the drive rod 122, thereby compressing the return spring 127. When the actuating force is subsequently removed from the pushbar 124, the spring 127 returns the drive rod 122 to its proximal position, and the bell cranks 126 translate the proximal movement of the drive rod 122 to forward movement of the pushbar 124, thereby returning the drive assembly 120 to its deactuated state.

The electronic actuator 130 includes a plunger 132 operably coupled with the drive rod 122, and a driver 134 operable to drive the plunger 132 from a proximal extended position to a distal retracted position. In certain embodiments, the driver 134 may comprise an electromagnet, and the plunger 132 may comprise a ferromagnetic plate that is secured to the drive rod 122. In other forms, the actuator 130 may be provided in the form of a solenoid. In certain forms, the actuator 130 may be another form of linear actuator. For example, the driver 134 may be provided in the form of a rotary motor, and the plunger 132 may be provided in the form of a threaded motor shaft that extends and retracts in response to rotation of the motor rotor in opposite directions. By way of example, such a motor embodiment of the driver 134 may be provided in the form of a stepping motor.

The electronic actuator 130 generally has three states: a retracting state, a holding state, and a releasing state. In the retracting state, the driver 134 exerts a sufficient retracting force on the plunger 132 to overcome the biasing force of the spring 127 such that the drive rod 122 moves to its retracted position, thereby actuating the drive assembly 120. In the holding state, the driver 134 exerts a sufficient retracting force on the plunger 132 to retain the drive rod 122 in its retracted position against the biasing force of the return spring 127, thereby holding or retaining the drive assembly 120 in its actuated state. With the driver 134 in the releasing state, the biasing force of the return spring 127 overcomes any retracting or holding force exerted by the driver 134 such that the drive rod 122 and the plunger 132 return to the extended positions thereof under the force of the return spring 127.

As will be appreciated, the retracting state and the holding state generally involve the consumption of electrical power, and the releasing state typically does not involve the consumption of power. The electronic actuator 130 may enter the retracting state in response to being supplied with a retracting power, may enter the holding state in response to being supplied with a holding power, and may enter the releasing state in response to termination of the supplied power. In embodiments in which the actuator 130 includes a solenoid, the retracting power may be provided in the form of a relatively higher power configured to drive the plunger 132 in the retracting direction against the biasing force of the return spring 127, and the releasing power may be provided in the form of a relatively lower power sufficient to retain the plunger 132 in the retracted position against the biasing force of the return spring 127. In embodiments in which the actuator 130 includes a stepper motor, the retracting power may be provided in the form of a series of electrical pulses configured to drive the motor in a direction that retracts the plunger against the force of the return spring 127, and the holding power may be provided in the form of a sustained pulse that retains the position of the rotor (and thus of the plunger 132) against the biasing force exerted by the return spring 127.

The latch control assembly 140 includes a control link 142 and a yoke 144 that is coupled to a retractor 154 of the latchbolt mechanism 150 such that movement of the control link 142 in the distal direction (to the left in FIG. 3) actuates the latchbolt mechanism 150 and retracts the latchbolt 152. The control link 142 is coupled with the drive rod 122 via the lost motion connection 108 such that retraction of the drive rod 122 (i.e., movement of the drive rod from its proximal or extended position to its distal or retracted position) causes a corresponding retraction of the control link 142, thereby retracting the latchbolt 152. Thus, retraction of the drive rod 122 by either the pushbar 124 or the electronic actuator 130 serves to retract the latchbolt 152.

Should the drive assembly 120 remain in its actuated state, the drive rod 122 will remain in its retracted position, and the latchbolt 152 will accordingly remain retracted. Thus, when the electronic actuator 130 is in the holding state, the exit device 90 remains dogged, and the door 70 can be opened from either the secured side or the unsecured side by applying the appropriate one of a pushing force or a pulling force. When power to the actuator 130 is subsequently removed, the drive assembly 120 and the latchbolt mechanism 150 returns to the extended or deactuated states thereof under the internal biasing forces of the pushbar assembly 100.

With additional reference to FIG. 3, the illustrated exit device 90 is in communication with an access control system 80 that includes a power supply 82. During normal operation, the power supply 82 is connected to the exit device 90 such that the electronic actuator 130 is operable to draw electrical power from the power supply 82. In certain forms, the power supply 82 may be an external power supply, such as line power or a remote battery. In other embodiments, the power supply 82 may be internal to the exit device 90, and may be provided in the form of a battery or a supercapacitor. The access control system 80 may further include at least one of a credential reader 84 or an access management system 86, and in certain embodiments may be considered to include the exit device 90. As described herein, the power supply 82 is selectively connected with the electronic actuator 130 via a switch 230 of the interrupt assembly 200 such that the interrupt assembly 200 is operable to selectively disconnect the actuator 130 from the power supply 82. In some embodiments, the switch 230 of the interrupt assembly 200 may also be configured to provide a notification that the switch 230 has entered an open state. Such notification may be provided to the access control system 80 and/or to secondary equipment such as audible and/or visual indicators, which may be internal or external to exit device 90. This functionality may be implemented with a parallel circuit of a single pole switch, a second pole on the same switch, a second switch in the same actuator mechanism, or by other means. Further information regarding an exemplary form of such functionality is provided below with reference to FIG. 7.

Figure 4:
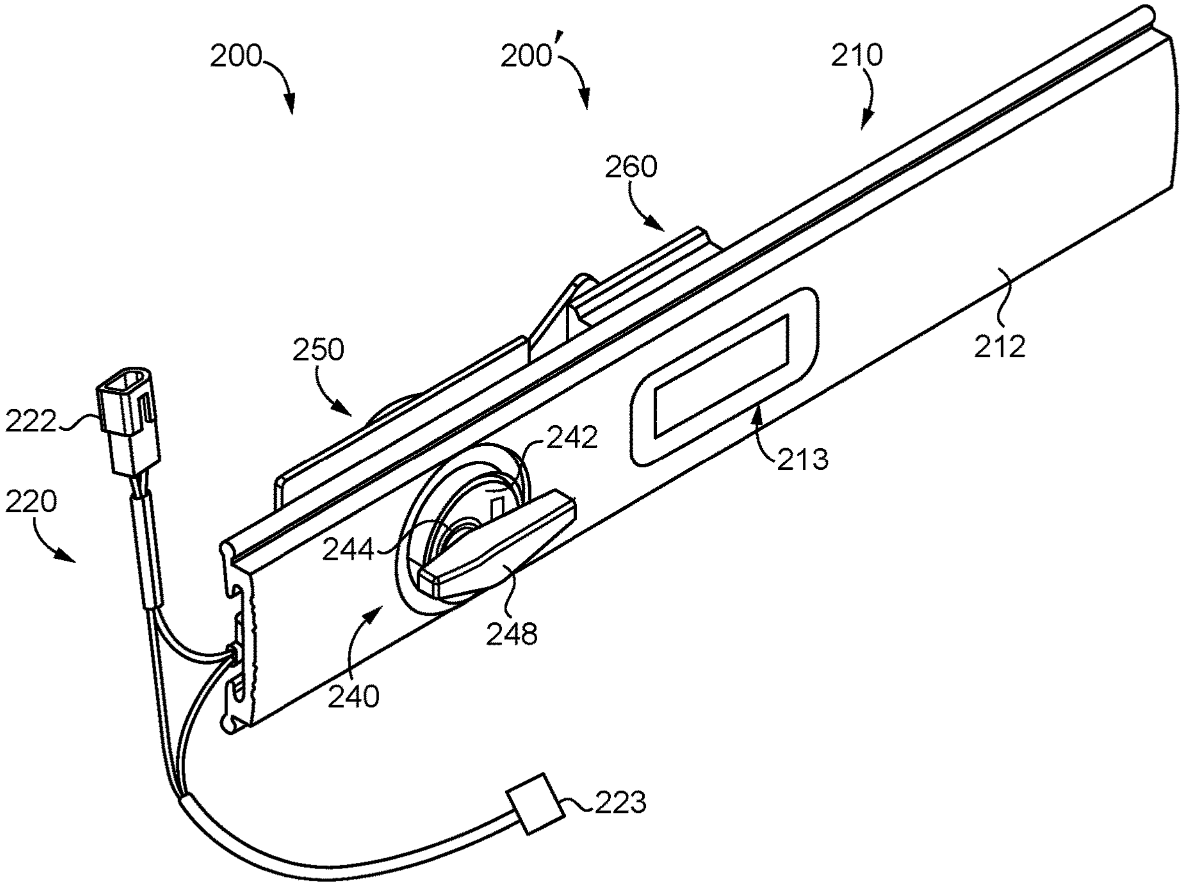
FIG. 4 is a perspective view of an interrupt assembly according to certain embodiments
Figure 5:
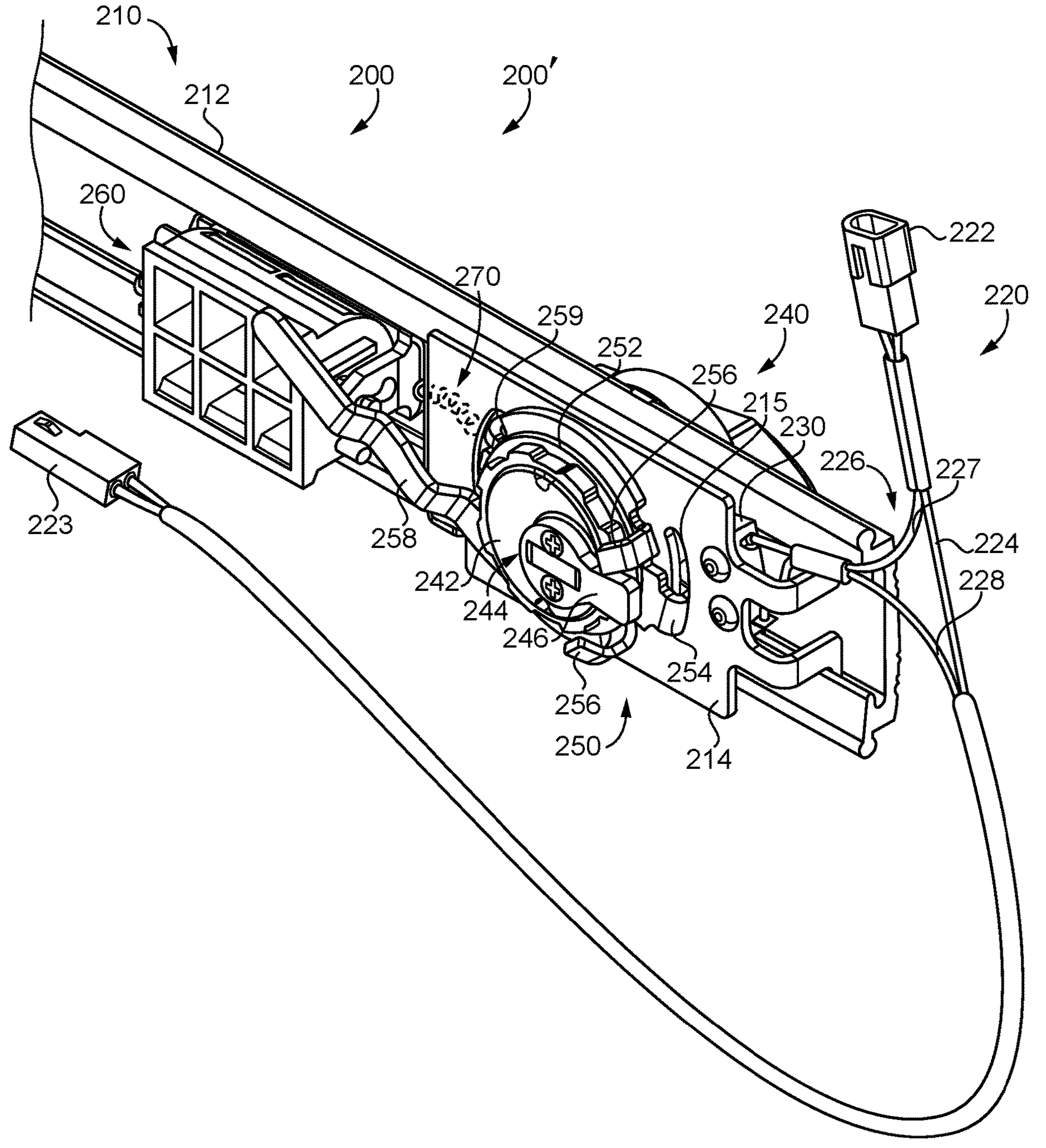
FIG. 5 is a second perspective view of the interrupt assembly illustrated in FIG. 4.

With additional reference to FIGS. 4 and 5, the interrupt assembly 200 includes a housing assembly 210, a wire harness 220, and a switch 230 connected to the wire harness 220. The interrupt assembly 200 also includes a manual actuating mechanism including a manual actuator 240 mounted to the housing assembly 210 and an actuating member in the form of an actuating ring 250 through which the manual actuator 240 extends. The interrupt assembly 200 may further include an indicator mechanism 260 mounted to the housing assembly 210.

The housing assembly 210 generally includes a faceplate 212 having a window 213 through which at least a portion of the indicator mechanism 260 is visible. The illustrated housing assembly 210 further includes a rear plate 214 mounted to the rear side of the faceplate 212. The switch 230 is mounted between the faceplate 212 and the rear plate 214, and the rear plate 214 includes an arcuate slot 215 through which a portion of the actuating ring 250 extends to interface with the switch 230. The illustrated faceplate 212 further mounts to the channel member 111, though in alternative embodiments the interrupt assembly 200 may utilize the channel member 111 directly, the 117 header casing, or other locations within or external to exit device 90.

The wire harness 220 includes an input connector 222 configured for connection with the power supply 82, an output connector 223 configured for connection with the electronic actuator 130, and a pair of wires extending between and connected to the input connector 222 and the output connector 223. The pair of wires includes a first or ground wire 224 extending between and connecting the connectors 222, 223, and a second or signal wire 226 including a first segment 227 connected to the input connector 222 and a second segment 228 connected to the output connector 223. Each of the signal wire segments 227, 228 is also connected to the switch 230 such that when the switch 230 is in the closed state, the wire segments 227, 228 are electrically connected to one another.

The switch 230 has a closed state and an open state. With the switch 230 in the closed state, the wire segments 227, 228 are connected to one another such that the signal wire 226 is operable to transmit signals between the input connector 222 to the output connector 223. With the switch 230 in the open state, the wire segments 227, 228 are disconnected from one another such that the signal wire 226 is inoperable to transmit signals from the input connector 222 to the output connector 223. Thus, the switch 230 is operable to selectively connect and disconnect the power supply 82 and the electronic actuator 130. In the illustrated form, the switch 230 is provided in the form of a mechanical microswitch. In other forms, the switch 230 may be provided in another form, such as a magnasphere switch, a reed switch, or another form of switch or sensor.

The manual actuator 240 includes a shell 242, a plug 244 rotatably mounted in the shell 242, a tailpiece 246 coupled to the plug 244, and an actuating member 248 operable to rotate the plug 244 relative to the shell 242. In the illustrated form, the manual actuator 240 is provided in the form of a thumbturn cylinder, and the actuating member 248 is provided in the form of a thumbturn that is secured to the plug 244. In other embodiments, the manual actuator 240 may be provided in the form of a lock cylinder (FIG. 1) having a tumbler system operable to selectively prevent rotation of the plug 244 relative to the shell 242. In such forms, the actuating member 248 may be provided in the form of a key operable to place the tumbler system in an unlocking state such that the plug 244 is rotatable relative to the shell 242. It is further contemplated that the manual actuator 240 may be integrated with switch 230, such as a pushbutton switch actuated by the user.

The actuating ring 250 includes an annular portion 252 through which the manual actuator 240 extends, a pair of lugs 256 extending radially outward from the annular portion, and a first actuating arm 254 that extends through the arcuate slot 215 and is operable to engage the switch 230. The actuating ring 250 may further include a second actuating arm 258 operable to engage the visual indicator 260 and/or an additional actuating arm 259 operable to engage an over-center spring mechanism 270. The tailpiece 246 extends radially outward from the plug 244 such that a portion of the tailpiece 246 is received between the lugs 256. During rotation of the plug 244 in a first direction, the tailpiece 246 engages one of the lugs 256 to cause a corresponding rotation of the actuating ring 250 in the first direction. During rotation of the plug 244 in an opposite second direction, the tailpiece 246 engages the other of the lugs 256 to cause a corresponding rotation of the actuating ring 250 in the second direction.

The actuating ring 250 is one form of an actuating member that moves between a locked position and an unlocked position in response to rotation of the tailpiece 246, and is configured to rotate between the locked and unlocked positions. It is also contemplated that the tailpiece 246 may serve as a cam that linearly drives an actuating member between locking and unlocked positions. In certain embodiments, the tailpiece 246 may directly interface with the switch 230, and the locking member may be omitted.

Figure 6:
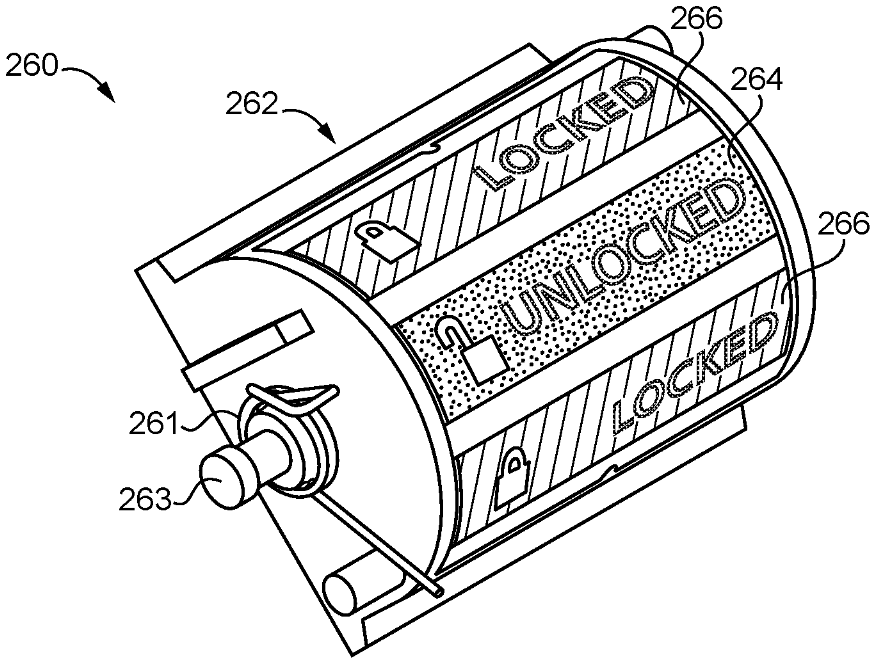
FIG. 6 is a perspective view of a visual indicator according to certain embodiments.

With additional reference to FIG. 6, the visual indicator 260 includes a barrel 262 having an axle 263 that extends from opposite ends thereof, and which facilitates the rotatable mounting of the indicator 260 to the faceplate 212. The barrel 262 includes unlocked indicia 264 indicating that the exit device 90 is in an unlocked state and locked indicia 266 indicating that the exit device 90 is in a locked state. The indicia 264, 266 may, for example, include colors, words, or symbols, and in the illustrated form includes colors, words, and symbols. More particularly, the unlocked indicia 264 include the word "UNLOCKED," a symbol associated with the unlocked state, and a background of a first color. The locked indicia 266 include the word "LOCKED," a symbol associated with the locked state, and a background of a second color. The visual indicator 260 also includes a torsion spring 261 that is engaged between the barrel 262 and the faceplate 212 and which biases the barrel 262 to a position in which a selected group of indicia 264, 266 is visible via the window 213 in the faceplate 212.

The visual indicator 260 is configured to interface with the second actuating arm 258 such that movement of the arm 258 causes the visual indicator 260 to selectively display the unlocked and locked indicia 264, 266 through the window 213. In the illustrated form, the visual indicator 260 includes a pivoting barrel 262 having the unlocked and locked indicia 264, 266 printed thereon. It is to be appreciated that the visual indicator may be provided in another form. For example, the pivoting barrel 262 may be replaced with a sliding plate having the indicia printed thereon.

While the illustrated visual indicator 260 is a mechanical visual indicator, it is also contemplated that the visual indicator may be electronic. As one example, the indicia 264, 266 may be provided in the form of light-emitting diodes (LEDs) of different colors, or the indicator 260 may include a display (e.g., an electronic ink display, a liquid crystal display, or an LED display) that selectively displays unlocked indicia and/or locked indicia based upon the position of the second actuating arm 258. Such electronic visual indicators may be powered by a separate line to the power supply 82 such that the visual indicator remains operable when the power supply 82 is disconnected from the electronic actuator 130. Alternatively, the electronic visual indicator may be powered by a secondary power supply. In certain forms, such a secondary power supply may be provided in the form of an energy storage device such as a battery or a super-capacitor. In certain forms, the energy storage device may be configured to store energy from the power supply 82 when the power supply 82 is connected, and to discharge energy to the visual indicator 260 when the power supply 82 is disconnected.

With the exit device 90 assembled and installed with the access control system 80, the user may place the exit device 90 in the unlocked condition. In this state, the switch 230 is in the closed state such that the power supply 82 is connected with the electronic actuator 130. As such, the access control system 80 is operable to supply power to the electronic actuator 130 to cause the actuator 130 to retract the latchbolt 152 in the manner described above. In certain forms, the access control system 80 may cause the power supply 82 to supply power to the actuator 130 in response to an authorized credential being presented to the credential reader 84 and/or based upon a schedule dictated by the access management system 86. Thus, with the exit device 90 in the unlocked condition, the access control system 80 is operable to transition the exit device 90 from the secured condition to the unsecured condition.

In certain circumstances, it may be desirable to prevent the access control system 80 from transitioning the exit device 90 from the secured condition to the unsecured condition. For example, there may be an armed or otherwise dangerous intruder in the facility. In such circumstances, it would be desirable to have the exit device 90 remain in the secured condition even when the schedule of the access management system indicates that the exit device 90 should remain dogged in the unsecured condition. Additionally, it may be the case that the intruder has gained access to an authorized credential. Accordingly, it would also be desirable to prevent the access control system 80 from placing the exit device 90 in the unsecured condition even when an authorized credential is presented to the credential reader 84.

In situations such as those described above, the user may operate the interrupt assembly 200 to lock the exit device 90 in the secured condition. Such operation generally involves actuating the manual actuator 240 to rotate the plug 244. In embodiments in which the manual actuator 240 is provided in the form of a thumbturn cylinder, actuating the manual actuator 240 may simply involve rotating the thumbturn actuating piece 248. In embodiments in which the manual actuator 240 is provided in the form of a lock cylinder, actuating the manual actuator may involve inserting the key actuating piece 248 into the lock cylinder and rotating the key.

As the plug 244 rotates the tailpiece 246 in the locking direction, the tailpiece 246 engages one of the lugs 256 and causes a corresponding rotation of the actuating ring 250 toward its locked position. As the actuating ring 250 rotates, the first actuating arm 254 moves so as to cause the switch 230 to transition from the closed state to the open state, thereby interrupting the connection between the power supply 82 and the electronic actuator 130. Additionally, the second actuating arm 258 moves to a lock-indicating position so as to cause the visual indicator 260 to stop displaying the unlocked indicia 264 and/or to start displaying the locked indicia 266.

As should be evident from the foregoing, operation of the interrupt assembly 200 serves to interrupt the connection between the power supply 82 and the electronic actuator 130, thereby placing the exit device in the locked condition. Thus, even in the event that the access control system 80 attempts to send a signal that would otherwise cause the actuator 130 to retract the latchbolt 152, the physical disconnect provided by the switch 230 prevents such a signal from reaching the actuator 130. As such, the access control system 80 is not operable to retract the latchbolt 152, and the exit device 90 remains in the secured condition.

Once the dangerous situation has passed, the user may operate the interrupt assembly 200 in reverse to return the exit device 90 to the unlocked condition. More particularly, the user may operate the manual actuator 240 to turn the plug 244 in an unlocking direction opposite the locking direction. As the plug 244 rotates the tailpiece 246 in the unlocking direction, the tailpiece 246 engages the other of the lugs 256 and causes a corresponding rotation of the actuating ring 250 toward its unlocked position. As the actuating ring 250 rotates, the first actuating arm 254 moves so as to cause the switch 230 to transition from the open state to the closed state, thereby reconnecting the power supply 82 and the electronic actuator 130. Additionally, the second actuating arm 258 moves to an unlock-indicating position so as to cause the visual indicator 260 to stop displaying the locked indicia 266 and/or to start displaying the unlocked indicia 264.

One or more features of the interrupt assembly 200 may aid in retaining the actuating ring 250 in the selected one of the locking and unlocked positions. As one example, an over-center spring mechanism 270 may be engaged with a third actuating arm 259 of the actuating ring 250, and may act on the actuating ring 250 to selectively bias the actuating ring 250 toward its locked position and to selectively bias the actuating ring 250 toward its unlocked position. As the actuating ring 250 passes through a transition point between the locked position and the unlocked position, the direction in which the over-center spring mechanism 270 biases the actuating ring 250 switches, thereby ensuring that the actuating ring 250 remains in the selected position until the manual actuator 240 once again moves the actuating ring 250 toward the other position and past the transition point.

In certain embodiments, the interrupt assembly 200 may be provided in a retrofit kit 200' for an existing exit device 90, and the faceplate 212 may be configured to replace the existing faceplate 113. Such a retrofit kit 200' may further include a power supply 82 in the form of an energy storage device. The energy storage device 82 may be connected to the first segment 227 of the signal wire 226, for example via the input connector 222. The retrofit kit 200' may additionally or alternatively include an electronic actuator 130 in the form of a solenoid or a motor-driven linear actuator. The electronic actuator 130 may be connected to the second segment 228 of the signal wire 226, for example via the output connector 223.

As noted above, in certain forms, the interrupt assembly 200 may be configured to provide an indication that the interrupt assembly 200 has been operated to disconnect the actuator 130 from the power supply 82. Further details regarding an example configuration by which such notification may be provided will now be described with reference to FIG. 7.

Figure 7:
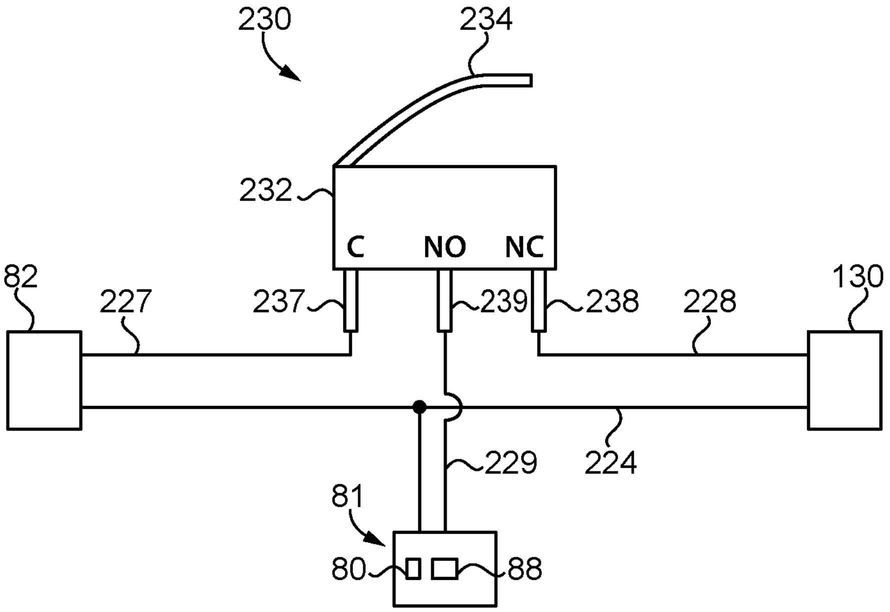
FIG. 7 is a schematic diagram of circuitry according to certain embodiments.

With reference to FIG. 7, illustrated therein are further features of the switch 230. The switch 230 includes a body portion 232, a leaf spring 234 extending from the body portion 232, a common (C) terminal 237, a normally closed (NC) terminal 238, and a normally open (NO) terminal 239. As will be appreciated by those familiar with snap-action switches, the common terminal 237 is selectively connected to the normally closed terminal 238 and the normally open terminal 239 based upon the position of the leaf spring 234. More particularly, the common terminal 237 is connected with the normally closed terminal 238 when the leaf spring 234 is in a home position, and is connected with the normally open terminal 239 when the leaf spring 234 is in a depressed position.

In the illustrated form, the actuating arm 254 is configured to allow the leaf spring 234 to remain in its home position when the actuating ring 250 is in its unlocked position, and to depress the leaf spring 234 when the actuating ring 250 is in its locked position. As a result, the common terminal 237 is connected with the normally closed terminal 238 (and disconnected from the normally open terminal 239) when the actuating ring 250 is in its unlocking position, and is disconnected from the normally closed terminal 238 (and is connected to the normally open terminal 239) when the actuating ring 250 is in its locking position. Accordingly, the first wire segment 227 and the second wire segment 228 are respectively connected to the common terminal 237 and the normally closed terminal 238 to ensure that the motor 130 is operable to receive power from the power supply 82 when the actuating ring 250 is in its unlocking position, and cannot receive power from the power supply 82 when the actuating ring 250 is in its locking position. As will be appreciated, this configuration may be reversed. For example, in embodiments in which the actuating arm 254 depresses the leaf spring 234 while the actuating ring 250 is in its unlocked position, the segments of the signal wire 226 may be connected to one another via the normally open terminal 239.

In the illustrated form, a return wire 229 connects the switch to one or more components 81 such that the one or more components 81 are connected to the power supply 82 when the motor 130 is disconnected from the power supply 82. In the illustrated form, the motor 130 is connected to the switch 230 at the normally closed terminal 238, and the one or more components 81 are therefore connected to the switch 230 via the normally closed terminal 239. It is to be appreciated that the return wire 229 may instead be connected to the switch 230 at the normally closed terminal 238, for example in embodiments in which the motor 130 is connected to the switch 230 at the normally open terminal 239. With the motor 130 and the one or more components 81 connected to the switch 230 at opposite terminals 238, 239, the power supply 82 is at all times connected to either the motor 130 or the one or more components 81. Thus, when the motor 130 is disconnected from the power supply 82 (i.e., when the locking ring 250 is in its locking position), the one or more components 81 are operable to receive power from the power supply 82.

As one example, the one or more components 81 can include the access control system 80. In such forms, the access control system 80 may receive a signal when the interrupt assembly 200 has been operated to disconnect the motor 130 from the power supply 82. As another example, the one or more components 81 may include an audible and/or visual indicator 88, such as a buzzer and/or a light. In such forms, the indicator 88 may provide an audible and/or visual indication that the exit device 100 has been placed in a locked mode. In certain forms, the indicator 88 may be used in addition to or as an alternative to the illustrated status indicator 260.

While the one or more components 81 are illustrated as being connected to the same switch 230 as the motor 130, it is also contemplated that the component(s) 81 may be connected to a different switch from the motor 130. For example, where the switch 230 is actuated by the actuating arm 254, a separate switch connected to the component(s) 81 may be actuated by the actuating arm 258.

In the illustrated form, an access control device is provided in the form of an exit device 90, and a locking member having a locked position and an unlocked position is provided in the form of a latchbolt 152 having an extended position and a retracted position. It is also contemplated that the access control device and/or the locking member may be provided in another form. As one example, the access control device may be provided in the form of an electrified strike or an electrified lockset, which may be of the mortise, cylindrical, or tubular format. In certain forms, the locking member of such a lockset may be a bolt, such as a latchbolt or a deadbolt, and the locked position and the unlocked position may be provided in the form of an extended position and a retracted position. Alternatively, the locking member may be a member that prevents operation of the lockset from the exterior side of the door when in the locked position, and which permits operation of the lockset from the exterior side of the door when in the unlocked position. Furthermore, while one exemplary form of exit device has been described and illustrated, it is to be appreciated that the systems and methods described herein may be utilized in connection with other forms of exit devices.

Furthermore, while the illustrated access control device returns to the locked state under the force of a return spring 127, it is also contemplated that the access control device may return to the locked state upon removal of electric power by other means. For example, the access control device may be a fail-secure or electrically-unlocked access control device, which may include an energy storage device such as a supercapacitor that discharges upon removal of electric power to electrically return the access control device to its locked state.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An access control device, comprising:

a locking member having a locking position and an unlocking position;

an electronic actuator operably connected with the locking member;

a switch electrically connected between the electronic actuator and a power supply, the switch having a first switch state in which the electronic actuator is electrically connected to the power supply and is operable to maintain the locking member in the unlocking position, the switch having a second switch state in which the electronic actuator is electrically disconnected from the power supply; and a manual actuator operable to transition the switch between the first switch state and the second switch state;

wherein movement of the switch from the first switch state to the second switch state by the manual actuator renders the electronic actuator inoperable to move the locking member.

2. The access control device of claim 1, further comprising a visual indicator engaged with the manual actuator, the visual indicator having a first visual indicator state in which the visual indicator displays a first indicium, the visual indicator having a second visual indicator state in which the visual indicator displays a second indicium different from the first indicium, wherein the manual actuator is configured to transition the visual indicator between the first visual indicator state and the second visual indicator state as the manual actuator transitions the switch between the second switch state and the first switch state.

3. The access control device of claim 1, wherein the manual actuator includes a shell, a plug rotatably mounted in the shell, and a tailpiece coupled with the plug.

4. The access control device of claim 3, further comprising an actuating member configured to move between a locking position and an unlocking position in response to rotation of the tailpiece, wherein the actuating member is associated with the switch such that the switch adopts the second switch state in response to the locking position and such that the switch adopts the first switch state in response to the unlocking position.

5. The access control device of claim 4, wherein the actuating member includes a first actuating arm configured to selectively engage the switch to transition the switch between the first switch state and the second switch state.

6. The access control device of claim 4, further comprising an over-center spring mechanism configured to selectively bias the actuating member toward the locking position and to selectively bias the locking member toward the unlocking position.

7. The access control device of claim 4, wherein the actuating member comprises an annular portion through which the manual actuator extends, and wherein the actuating member is configured to rotate between the locking position and the unlocking position.

8. The access control device of claim 1, wherein the locking member comprises a bolt, wherein the locking position is an extended position of the bolt, and wherein the unlocking position is a retracted position of the bolt.

9. The access control device of claim 8, wherein the electronic actuator, when connected with the power supply via the switch, is configured to retract the bolt in response to receiving a retracting power from the power supply, and to hold the bolt in the retracted position in response to receiving a holding power from the power supply.

10. The access control device of claim 8, further comprising a drive assembly having an actuated state and a deactuated state, wherein the drive assembly is biased toward the deactuated state by at least one spring, wherein the drive assembly is configured to retract the bolt when moved from the deactuated state to the actuated state, and wherein the drive assembly is operable to be manually actuated by a user via a second manual actuator.

11. The access control device of claim 10, wherein the electronic actuator includes a plunger operably connected with the drive assembly, and a driver operable to move the plunger to actuate the drive assembly against a biasing force biasing the drive assembly toward the deactuated state.

12. The access control device of claim 1, further comprising: an actuating ring mounted for rotation between a first position and a second position, wherein the first position of the actuating ring is a locking position in which the first actuating arm sets the switch to the second switch state, and wherein the second position of the actuating ring is an unlocking position in which the first actuating arm sets the switch to the first switch state, the actuating ring comprising:

- an annular portion through which a portion of the manual actuator extends;
- at least one lug extending from the annular portion and operable to engage the manual actuator such that rotation of the manual actuator causes a corresponding rotation of the actuating ring; and
- a first actuating arm extending from the annular portion and operable to actuate the switch such that rotation of the actuating ring between the first position and the second position causes the actuating arm to transition the switch between the second switch state and the first switch state;
- a visual indicator; and
- a faceplate including a window through which at least a portion of the visual indicator is visible;
- wherein the actuating ring further comprises a second actuating arm; and
- wherein the visual indicator is configured to display at least one indicium via the window based upon a position of the second actuating arm.

13. The access control device of claim 12, wherein the visual indicator is configured to display a locked indicium when the second actuating arm is in a lock-indicating position corresponding to the locking position of the actuating ring, and wherein the visual indicator is configured to display an unlocked indicium when the second actuating arm is in an unlock-indicating position corresponding to the unlocking position of the actuating ring.

14. The access control device of claim 13, wherein the visual indicator is a mechanical visual indicator comprising the locked indicium and the unlocked indicium.

15. The access control device of claim 12, wherein the access control device is an existing access control device including an existing faceplate, and wherein the faceplate is a retrofit faceplate configured to replace the existing faceplate.

16. An access control device, comprising:

- a locking member having a locking position and an unlocking position;
- an electronic actuator operably connected with the locking member and operable to move the locking member from the locking position to the unlocking position;
- an electronic switch operable to selectively electrically connect the electronic actuator with a power supply; and
- a manual actuator operable to transition the electronic switch between a first switch state and a second switch state;
- wherein the manual actuator comprises one of a thumbturn or a lock cylinder; and
- wherein movement of the electronic switch from the first switch state to the second switch state by the manual actuator renders the electronic actuator inoperable to move the locking member.

17. The access control device of claim 16, wherein the electronic actuator is operable to draw power from the power supply when the electronic switch is in the first switch state; and

- wherein the electronic actuator is electrically disconnected from the power supply when the electronic switch is in the first second switch state.

18. The access control device of claim 16, further comprising a second manual actuator, wherein the second manual actuator is operable to move the locking member from the locking position to the unlocking position.

19. An access control device, comprising:

- a locking member having a locking position and an unlocking position;
- an electronic actuator operably connected with the locking member;

an electronic indicator mechanism operable to electronically indicate a state of the access control device;

a switch configured for connection with a power supply, the switch having a first state and a second state; and a manual actuator operable to transition the switch between the first state and the second state;

wherein, with the switch in the first state, the electronic actuator is connected with the power supply and the electronic indicator mechanism is disconnected from the power supply; and wherein, with the switch in the second state, the electronic actuator is disconnected from the power supply and the electronic indicator mechanism is connected with the power supply.

20. The access control device of claim 19, wherein the manual actuator comprises one of a thumbturn or a lock cylinder.

21. The access control device of claim 19, further comprising a second manual actuator, wherein the second manual actuator is operable to move the locking member from the locking position to the unlocking position.

22. The access control device of claim 19, wherein, with the switch in the first state, the electronic actuator is configured to move the locking member from the locking position to the unlocking position in response to receiving power from the power supply.

23. The access control device of claim 16, wherein the first switch state is a closed state; and wherein the second switch state is an open state.

24. The access control device of claim 1, wherein the first switch state is a closed state; and wherein the second switch state is an open state.

25. The access control device of claim 19, wherein the electronic indicator mechanism comprises at least one of a light or a buzzer.

26. The access control device of claim 1, wherein the locking member comprises a latchbolt operable to selectively engage a strike;

wherein the latchbolt is operable to engage the strike when the locking member is in the locking position; and wherein the latchbolt is inoperable to engage the strike when the locking member is in the unlocking position.

27. The access control device of claim 1, wherein the electronic actuator draws power from the power supply when the switch is in the first switch state; and wherein the electronic actuator does not draw power from the power supply when the switch is in the second switch state.

28. The access control device of claim 1, wherein, with the switch in the first switch state, the access control device is operable to selectively retain the locking member in the locking position, and to selectively cause the electronic actuator to move the locking member from the locking position to the unlocking position in response to receipt of an unlock signal.

* * * * *